Oct. 2, 1956  W. A. BEDFORD, JR  2,764,791
FASTENING DEVICE FOR A SUPPORT
Filed Oct. 2, 1952
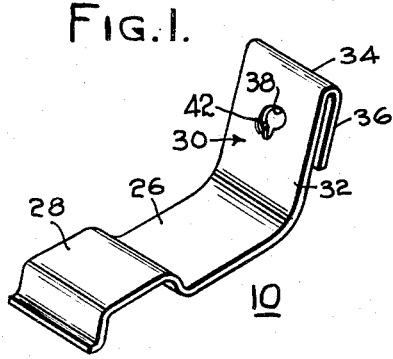
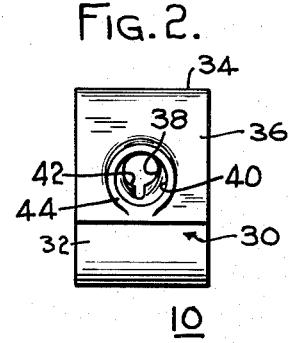
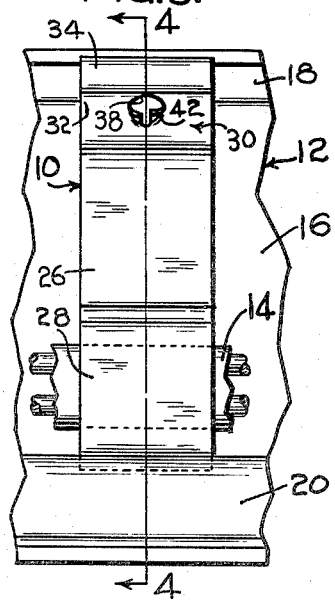
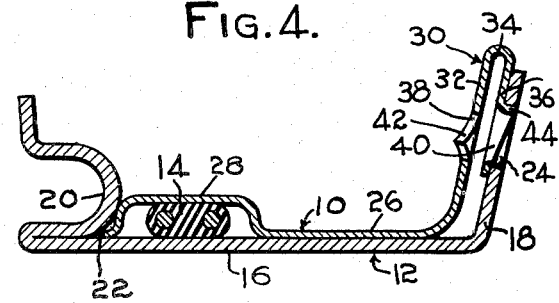
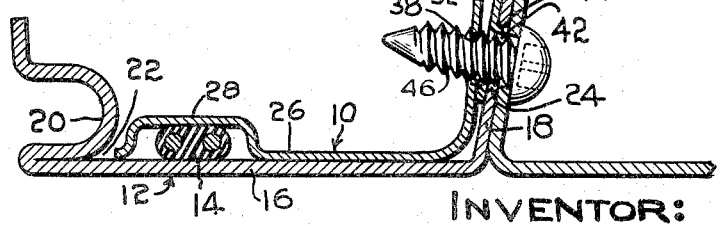
INVENTOR:
WILLIAM A. BEDFORD JR.,
BY Robert E Ross
ATTORNEY.

United States Patent Office 2,764,791
Patented Oct. 2, 1956

2,764,791

FASTENING DEVICE FOR A SUPPORT

William A. Bedford, Jr., North Scituate, Mass., assignor to United-Carr Fastener Corporation, Cambridge, Mass., a corporation of Massachusetts Application October 2, 1952, Serial No. 312,727

3 Claims. (Cl. 24—73)

This invention relates generally to fastening devices, and has particular reference to a fastener for retaining a wire or the like onto a support.

In the construction of refrigerators, automobiles, and many other devices, it is frequently necessary to secure a wire, tube, or similar elongated member to a support. Such supports are usually structural members and may have one or both edges inturned or in some manner deformed to impart rigidity thereto, and it is often desirable to secure the wire or tube to the support in such a manner that no portion of the fastener protrudes from a predetermined side of the support.

The object of the invention is to provide a fastener for retaining a wire or the like onto a support which has means at opposite ends thereof for engaging the support and intermediate means for retaining a wire against the support.

A further object of the invention is to provide a wire-retaining fastener assembly in which a fastener is attached to a support so that the fastener is completely disposed on one side of the support.

A still further object of the invention is to provide a wiring fastener which comprises an elongated body having intermediate means for retaining a wire against a support, and means extending from the body at one end for preliminary snapping engagement into an opening in an inturned edge of the support and for receiving a threaded member inserted through the opening.

Other objects of the invention will, in part, be obvious, and will, in part, appear hereinafter.

In the drawing:

Fig. 1 is a perspective view of a fastener embodying the features of the invention;

Fig. 2 is an end view of the fastener of Fig. 1;

Fig. 3 is a plan view of the fastener of Fig. 1 assembled into a channel shaped support;

Fig. 4 is a view in section taken on line 4—4 of Fig. 3; and

Fig. 5 is a view similar to Fig. 4 in which the assembly of the fastener into the support has been completed by the assembly of a threaded member through the fastener and the support.

Referring to the drawing, there is illustrated a fastening device 10 which is adapted for assembly into a channelled support 12, to retain a wire 14 or the like in assembly thereon.

The support 12 in the particular embodiment illustrated comprises a central web portion 16, a flange 18 on one side thereof, and a reverse bend edge portion 20 on the opposite side, forming a fastener receiving recess 22. The flange 18 is provided with an opening 24 to receive a portion of the fastener as will be hereinafter described.

The fastener 10 is formed of a single piece of sheet metal, and comprises a body portion 26 having an upwardly spaced portion 28 near one end, and a U-shaped portion 30 at the other end. The U-shaped portion 30 comprises a first leg 32 which extends angularly from the body to a reverse bend portion 34, and a second leg 36 which extends from the reverse bend portion toward the plane of the body on the side of the first leg opposite the body. The legs 32 and 36 have aligned openings 38 and 40 respectively, and the portion of the leg 32 disposed about the opening 38 therein is formed into a helical thread-engaging edge 42. The portion of the leg 36 disposed about the opening 40 therein is formed into a peripheral lip 44 which protrudes from the leg 36 on the side opposite the leg 32, and the lip 44 has a height which increases gradually in the direction of the reverse bend 34, to provide a camming action during the assembly of the fastener as will appear hereinafter.

To assemble the wire 14 and the fastener 10 with the support 12, the end of the fastener adjacent the upwardly spaced portion 28 is seated in the recess 22 at a point opposite the opening 24 in the flange 18, and the wire 14 is placed between the web portion 16 of the support and the upwardly spaced portion 28. The fastener is then pushed toward the support so that the leg 36 passes inside the flange 18, so that the protruding lip 44, in passing inside the edge of the flange 18 flexes the leg 36 until the lip 44 snaps into the opening 24 therein. The fastener is thereby securely retained on the support in preparation for the final assembly operation. (See Figs. 3 and 4.)

The assembly may then be completed by the insertion of a threaded member 46 through the opening 24 in the flange and the openings 38 and 40 in the legs, so that the threaded member engages the helical edge 42 and draws the leg 32 toward the leg 36 and the flange 18. During the tightening of the threaded member 46, the movement of the leg 32 may draw the opposite end of the body out of the recess 22; however the flexing of the leg 32 during such movement also causes the body portion 26 to be pressed tightly against the web portion 16 of the support, thereby firmly retaining the wire 14 in position without the necessity of the end of the fastener being disposed in the recess. (See Fig. 5.)

It will, of course, be understood that in some applications the depth of the recess may be sufficient that the end of the fastener will not come completely out of the recess when the screw is assembled. In other modifications, the legs may be spaced closer together so that substantially no movement of the body portion occurs when the threaded member is tightened in the legs.

Since certain other obvious modifications may be made in the device without departing from the scope of the invention, it is intended that all matter contained herein be interpreted in an illustrative and not in a limiting sense.

I claim:

1. A fastening device for assembly onto a support, said support having a flange along one edge provided with an opening therein, and fastener engaging means spaced from said flange, said fastening device comprising a body portion having one end for cooperating with said fastener engaging means to support said one end, the other end of said body portion being reversely bent forming a U-shaped portion extending from the plane of the body and having legs substantially parallel to and spaced from one another, said legs having aligned openings to receive a threaded member inserted through the opening in the flange, one of said legs having projecting means for snapping engagement into the flange opening of the support, the other of said legs having means formed about the opening therein to receive the threaded member in threaded engagement.

2. A fastening device for assembly onto a support, said support having a flange along one edge provided with an opening therein, and fastener engaging means spaced from said flange, said fastening device comprising a body portion having one end for cooperating with said fastener engaging means to support said one end, the other end of said body portion having a first leg portion extending away from the plane of the body and then bent back on itself on the side away from the body to form a second leg extending toward the plane of the body, said legs having aligned openings therein, said first leg having means formed about the opening to engage a threaded member, said second leg having means projecting about the opening for snapping engagement into the flange opening of the support.

3. A fastening device in accordance with claim 1 in which the body portion has a transverse wire retaining portion formed therein adjacent the end cooperating with the fastener engaging means, and spaced from the plane of the remainder of the body portion to confine a wire or the like against the support.

References Cited in the file of this patent

UNITED STATES PATENTS

| | | |
|---|---|---|
| 2,382,678 | Tinnerman | Aug. 14, 1945 |
| 2,671,254 | Meyer | Mar. 9, 1954 |

FOREIGN PATENTS

| | | |
|---|---|---|
| 145,256 | Great Britain | July 2, 1920 |
| 451,945 | Great Britain | Aug. 12, 1936 |